United States Patent

Chmielewski, Jr. et al.

[11] Patent Number: 6,005,704
[45] Date of Patent: Dec. 21, 1999

[54] CABLE DRIVEN IMAGE STEERING AND FOCUSING DEVICE

[75] Inventors: Thomas A. Chmielewski, Jr., Langhorne, Pa.; Michael Negin, Tabernacle, N.J.; Glen Van Sant, Langhorne; Chris Killion, Huntingdon Valley, both of Pa.

[73] Assignee: Sensar, Inc., Moorestown, N.J.

[21] Appl. No.: 08/980,266

[22] Filed: Nov. 28, 1997

Related U.S. Application Data

[63] Continuation-in-part of application No. 08/648,324, May 15, 1996, Pat. No. 5,717,512.

[51] Int. Cl.⁶ .................................................. G02B 26/08
[52] U.S. Cl. ........................ 359/210; 359/212; 359/223; 359/225; 359/226
[58] Field of Search .................................. 359/198, 199, 359/201, 202, 209, 210, 212–215, 223, 225, 226, 871, 872, 876, 877, 822–824; 382/291

[56] References Cited

U.S. PATENT DOCUMENTS

| | | | |
|---|---|---|---|
| 3,533,683 | 10/1970 | Stark et al. | 351/1 |
| 3,533,684 | 10/1970 | Stark et al. | 351/1 |
| 3,598,107 | 8/1971 | Ishikawa et al. | 128/2 |
| 3,600,098 | 8/1971 | Mohrman | 356/153 |
| 4,620,318 | 10/1986 | Hill | 382/2 |
| 4,623,930 | 11/1986 | Oshima et al. | 359/555 |
| 4,641,349 | 2/1987 | Flom et al. | 382/2 |
| 5,016,282 | 5/1991 | Tomono et al. | 382/2 |
| 5,276,546 | 1/1994 | Palm et al. | 359/210 |
| 5,291,560 | 3/1994 | Daugman | 382/2 |
| 5,359,674 | 10/1994 | van der Wal | 382/41 |
| 5,430,809 | 7/1995 | Tomitaka | 382/173 |

OTHER PUBLICATIONS

Provisional application Serial No. 60/007,906, filed Dec. 4, 1995.

*Primary Examiner*—James Phan
*Attorney, Agent, or Firm*—Buchanan Ingersoll, P.C

[57] ABSTRACT

A compact image steering and focusing device has a generally rotatable platform that carries a pan/tilt mirror. The rotatable platform, at least one motor driven lens and a camera are mounted on a housing. Two drive motors each with an associated cable are provided to rotate the rotatable platform and tilt the mirror. Light reflected from a subject is captured by the mirror and directed through the lens to the camera. The device can fit behind the cover plate of an automated teller machine. This system is preferably used with a narrow field of view camera and two wide field of view cameras. Images from the wide field of view cameras are used to focus the narrow field of view camera on one eye of the automated teller machine user to identify the user by iris analysis and comparison to an iris image on file.

23 Claims, 8 Drawing Sheets

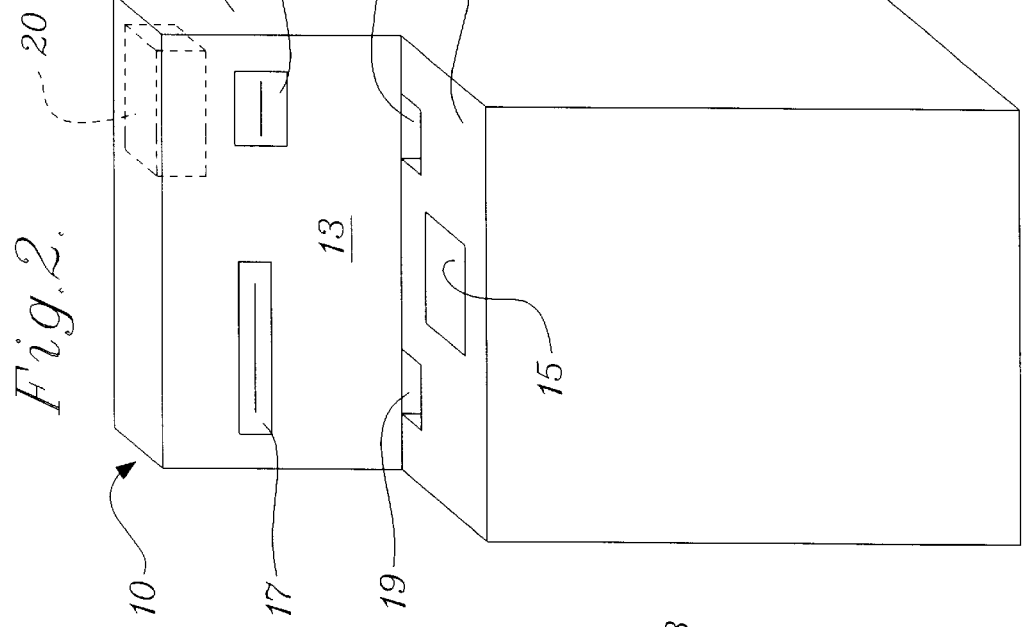
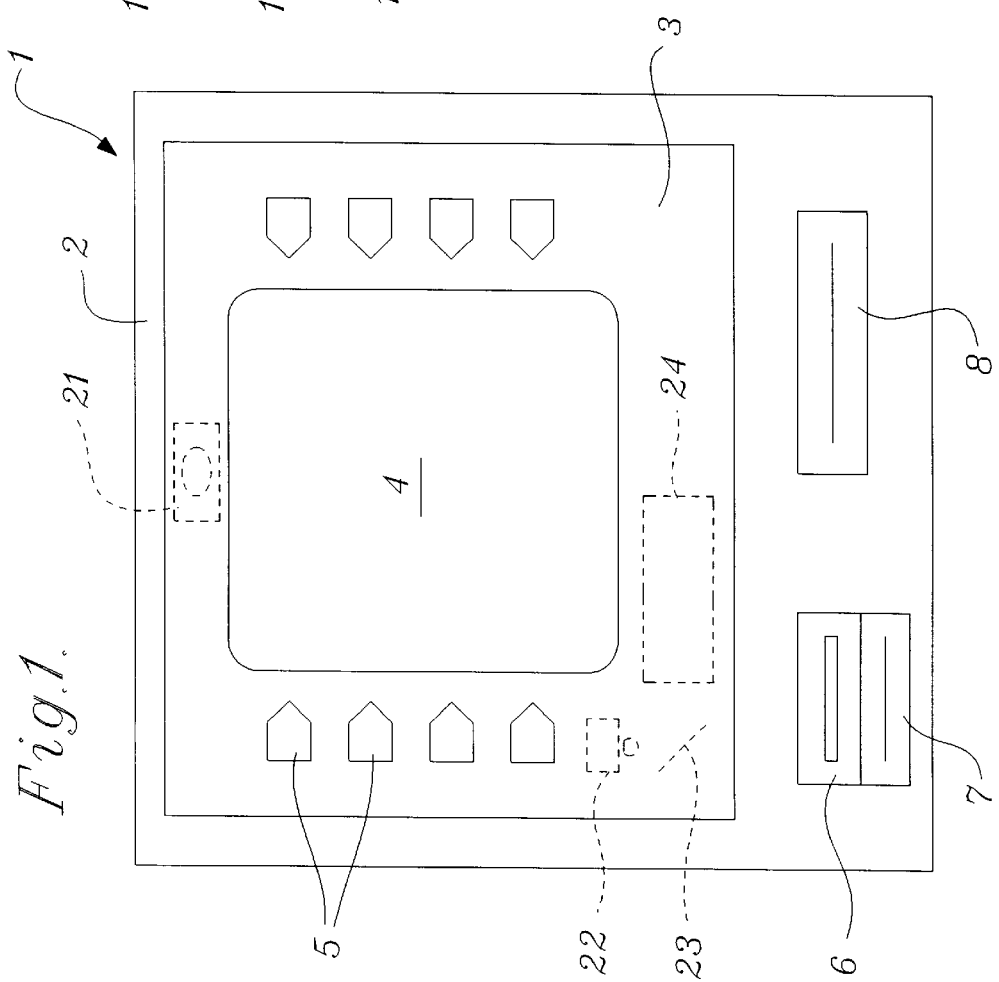

CABLE DRIVEN IMAGE STEERING AND FOCUSING DEVICE

CROSS REFERENCE TO RELATED APPLICATION

This is a continuation-in-part of U.S. patent application Ser. No. 08/648,324, filed May 15, 1996 U.S. Pat. No. 5,717,512.

BACKGROUND OF THE INVENTION

1. Field of the Invention

The invention relates to a device for directing light reflected from an object in a scene through at least one lens and into a camera.

2. Background of the Invention

There are several methods known as biometrics for recognizing or identifying an individual. These methods include analyzing a signature, obtaining and analyzing an image of a fingerprint and imaging and analyzing the retinal vascular patterns of a human eye. Recently the art has used the iris of the eye which contains a highly detailed pattern that is unique for each individual and stable over many years as a non-contact, non-obtrusive biometric. This technique is described in U.S. Pat. No. 4,641,349 to Flom et al. and U.S. Pat. No. 5,291,560 to Daugman. The systems described in these references require the person being identified to hold at least one of their eyes in a fixed position with respect to an imaging camera which takes a picture of the iris. While this procedure is satisfactory for some applications, it is not satisfactory for quick transactional activities such as using an automated teller machine, access control or automated dispensing.

The iris identification techniques disclosed by Flom and Daugman require a clear, well-focused image of the iris portion of the eye. In a present commercial embodiment an image is obtained and an iris code is derived from the image. That code is stored in an image file for a particular individual thereby completing an enrollment process. When that person asks to be identified a new image is used to compute the iris code which is then compared with the iris code on file. In this way the person can be identified quite rapidly. However, prior to the present invention there has not been an optical system which could rapidly acquire a sufficiently clear image of an iris of the person to be identified unless that person positioned his eye in a fixed position relatively close to an imaging camera. There is a need for an optical system which will rapidly obtain a clear picture of the iris of a person standing remotely from the optical system and in an uncertain position. This system would be particularly useful to identify users of automated teller machines as well as individuals seeking access to a restricted area or facility or other applications requiring user identification.

Automated teller machines, often called ATMs, are compact, sophisticated electrical devices which have a large number of electrical and electromechanical subsystems arranged in a restricted volume. However, there are small spaces immediately behind the cover plates of the automated teller machine or around the bezel of the display in which a very compact optical system could be placed. The location and size of that space may differ among automated teller machines. Yet, there are several manufacturers of these machines, two of which are NCR and OKI Electric. Each manufacturer offers several models, but the products in each manufacturer's ATM product line are quite similar. Although there are several basic types of ATMs, the NCR machine and the OKI machine are representative. Any optical system for iris identification of ATM users should be suitable for use in the various types of ATM machines. The system must also be able to rapidly obtain a clear image of the iris of the person using the automated teller machine and direct it to a camera. The camera records the image and transmits that image to a digital processor. The processor compares the iris code of the user's image with a file copy of the iris code defined by an enrollment process to complete the identification.

Many automated teller machines and similar financial transaction machines are equipped with video cameras typically positioned above the display panel. These video cameras are used for security purposes and are positioned to take a picture of the head and shoulders of the person using the machine. These cameras are not equipped to rapidly focus on a small region of the user's face. It is not possible for these cameras to obtain a sufficiently detailed image of the iris of the user of the machine which iris image could be used to identify the user. Therefore, there is a need for an optical system which can rapidly acquire and provide a clear, detailed image of the iris of the user which image is sufficient for identification of the user based upon iris analysis. Preferably, at least one of the cameras used with this optical system could be used as a conventional security camera.

SUMMARY OF THE INVENTION

The present compact system can obtain a clear image of a small region on an object located from one to three feet from the optical system. This distance can easily be changed by changing the lenses which are used. The system includes a rotatable platform which carries a pan/tilt mirror. The rotatable platform, at least one lens and a camera are mounted on a housing. Light reflected from the subject is captured by the mirror and directed through the lens to a camera. Two drive motors are provided with cable drive systems. One drive motor and associated cable rotates the pan/tilt mirror around a tilt axis. A second motor with a cable drive turns the platform to obtain the pan direction. Other motors for other image acquisition purposes such as a lens adjustment motor could be used. In a preferred embodiment, a narrow field of view (NFOV) camera receives the light reflected from the pan/tilt mirror through the lens. A second camera and preferably a third camera are provided to obtain a wide field of view (WFOV) image of the subject. Images from these cameras are processed to determine the coordinates of the specific location of interest, such as the head and shoulders and the iris of a person to be identified. Based upon an analysis of those images the focus and pan/tilt mirror are adjusted to receive light reflected from the iris or other area of interest and direct that reflected light to the narrow field of view camera. That camera produces an image of sufficient quality to permit iris identification.

A control system is provided to analyze the images from the wide field of view camera and thereby specify the location of a point or area of interest on the object or person being identified. A preferred technique for identifying the position of the user is stereographic image analysis. Alternatively, non-visible range imaging or distance finding devices such as ultrasonic, radar, spread spectrum microwave or thermal imaging or sensing could be used.

The present system can be readily fit into all conventional automated teller machines and many other financial transaction machines. Image acquisition and identification can generally be accomplished in less than five seconds.

Other objects and advantages will become apparent from a description of certain present preferred embodiments shown in the drawings.

BRIEF DESCRIPTION OF THE FIGURES

FIG. 1 is a front view of the face of one type of automated teller machine such as manufactured by NCR wherein a preferred location of our image steering and focusing device and optional camera are shown in chainline.

FIG. 2 is a perspective view of another type of automated teller machine manufactured by OKI Electric wherein a preferred location of our image steering and focusing device is shown in chainline.

BRIEF DESCRIPTION OF THE PREFERRED EMBODIMENTS

Figure 3:
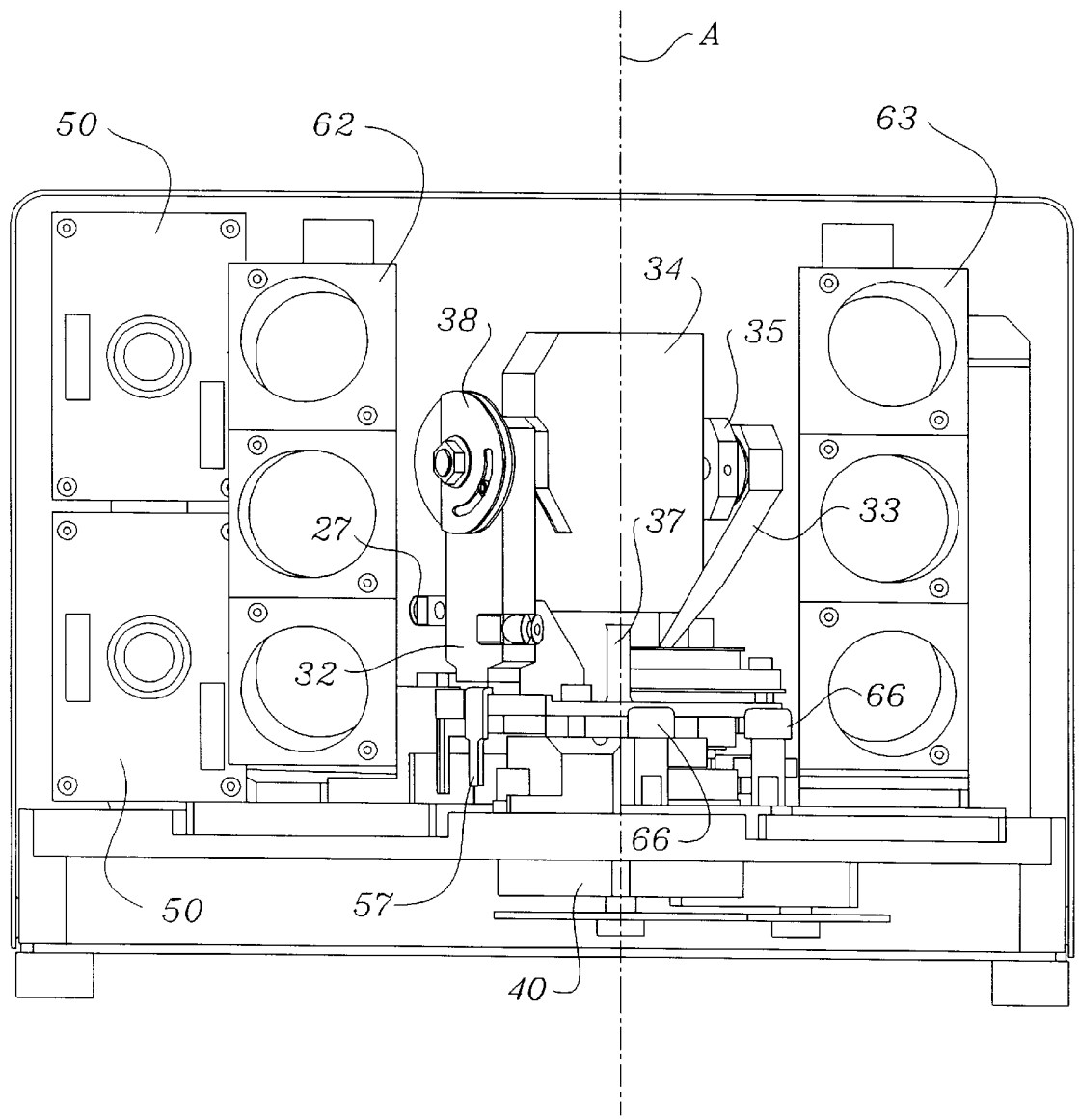
FIG. 3 is a front view of a present preferred embodiment of our steering and focusing device showing six illuminators and two WFOV cameras but with the drive cables omitted.

Two basic types of automated teller machines are illustrated in FIGS. 1 and 2. The dotted lines in those figures indicate the prospective position for our optical system and cameras used with that system.

In FIG. 1 there is shown an automated teller machine of the type manufactured by NCR. That machine 1 has a console 2 containing a CRT display 4. Adjacent to the display are transaction selection buttons 5 in a cover plate 3 which surrounds the CRT display 4. A card dip 6 and receipt printer are positioned below the cover plate 3. A currency dispenser 8 is positioned adjacent the card dip. It should be understood that the console could be configured so that the card dip 6, printer 7 and currency dispenser 8 are on the right side or left side of the cover 3. The cabinet for the NCR machine is designed to be positioned in a wall of a building or may be configured as part of a freestanding ATM.

The automated teller machine shown in FIG. 2 is a stand alone device such as is manufactured by OKI Electric. That machine has a cabinet 12 which sits on the floor. The cabinet has a vertical face 13 in which the card dip 16 and a printer 17 are located. The OKI machine 10 also has a counter 14 in which there is a touch type display pad 15. A bill dispenser 18 and coin dispenser 19 are provided on the counter adjacent the upright face 13.

In the OKI automated teller machine there is a space indicated by dotted line box 20 where an optical system and cameras can be placed. This volume is approximately 125 mm. wide, 120 mm. deep and 70 mm. high. Our optical system and cameras when configured within a housing will fit within this space. In the NCR machine shown in FIG. 1 volume of similar size is not available in any one location.

Therefore, as indicated by the dotted lines in FIG. 1 we propose to place our optical and focusing system at region 24 below the CRT display 4. Mirror 23 is a half silvered mirror so illumination could be injected and pass out of the front of the machine to illuminate the user. Light reflected from the user would enter our device through an opening (not shown) provided in the cover plate within region 24. Since we prefer to use infrared light we can place an infrared filter over the opening. A user cannot see through this filter, but infrared light readily passes. Consequently, the user need not be aware that a camera and optical system are present in the machine. A pan/tilt mirror within the device would direct light reflecting from the subject being identified to mirror 23. That light would be reflected by mirror 23 to camera 22. Of course, any infrared cutoff filters supplied with the camera by the manufacturer must be removed. A second and possibly third camera can be placed above the CRT display as indicated by dotted block 21.

The present preferred embodiment of our cable driven image steering and focusing device is shown in FIGS. 3, 4, 5 and 6. In this embodiment, a rotatable platform 31 is carried on base 30 which is held on a generally rectangular housing 28. A pan/tilt mirror 34 is glued or clamped onto a mirror frame 35 that is pivotably attached between arms 32 and 33 so the mirror and frame can rotate around tilt axis B shown in chainline in FIG. 5. Arms 32 and 33 are attached to platform 31. An axle 36 extends from the mirror frame 35 through arm 32 and split pulley 38. A second axle extends from the mirror frame 35 and through arm 33. Two angular contact bearings 26 mounted within arms 32 and 33 support the mirror and allow rotation. A stepper motor 40 is positioned below the rotatable platform and has an output shaft 37 that is coincident with the pan axis A in order to minimize inertia reflected on the pan motor. A cable 42' runs from the stepper motor 40 to a gear reduction pulley 41. Cable 42 runs from pulley 41 around two idler pulleys 27 and then around the pulley 38. The pulley 38 is clamped to the axle 36 and when turned by the motor rotates the mirror. We prefer to provide two optical sensors 44 on the platform behind the mirror and flags on the mirror to identify the clockwise and counterclockwise limits and home position. The optical sensors signal the control electronics when the pan/tilt mirror has rotated through a preset position such as 15 degrees from a position parallel to arms 32 and 33. These sensors also provide a means to calibrate the position of the pan/tilt mirror with respect to a coordinate frame associated with the motor.

The pan/tilt mirror is carried on rotatable platform 31 which rotates on a bearing 39. We prefer to provide a four point contact bearing 39 to achieve stiffness and minimum bearing height. Rotatable platform 31 is semi-circular in shape having a curved portion 53 and a flat edge 54 This cable 56 runs between stepper motor 58 and idler pulley 59 while pressing against the curved portion 53 of the rotatable platform. Consequently, movement of the cable 56 will turn the platform 31. The idler pulley is carried on an adjustable cam 60 which allows the idler pulley 59 to be moved toward or away from the stepper motor 58. This allows preloading of the cable to increase stiffness and eliminate lost motion. Two optical sensors 64 and 65 are provided near the rotatable platform to sense flags 57 on the platform. In this way the clockwise and counterclockwise limits and home position are identified. In addition, bumpers 66 can be provided to prevent over rotation in either direction.

In the present preferred embodiment the axes are oriented tilt over pan. The mirror is nodally mounted. Each axis is driven via a stepper motor and cable drive. There are two cables per each of both reduction stages wrapped in opposite directions on the drive pulley and fixed to opposite ends of split pulley for the tilt stage and with one wrap over an eccentric idler for the pan stage. The split pulleys and eccentric idler allow both sides of the cable to be preloaded, increasing the system stiffness and virtually eliminating lost motion. Use of the cable also produces a nearly ideal mechanism in that the drive link is virtually massless. As this link connects the load, i.e. mirror, to the drive motors, there is significant attenuation of the primary vibration sources. This feature supports the need for short settling times.

The cables preferably are Spectra 2000, 0.012 inch diameter cable. This material possesses high tensile strength which allows it to be wrapped on a pulley diameter much smaller than could be tolerated by a steel cable. Additionally, the cable is highly resistant to abrasion and has a low coefficient of thermal expansion.

Figure 4:
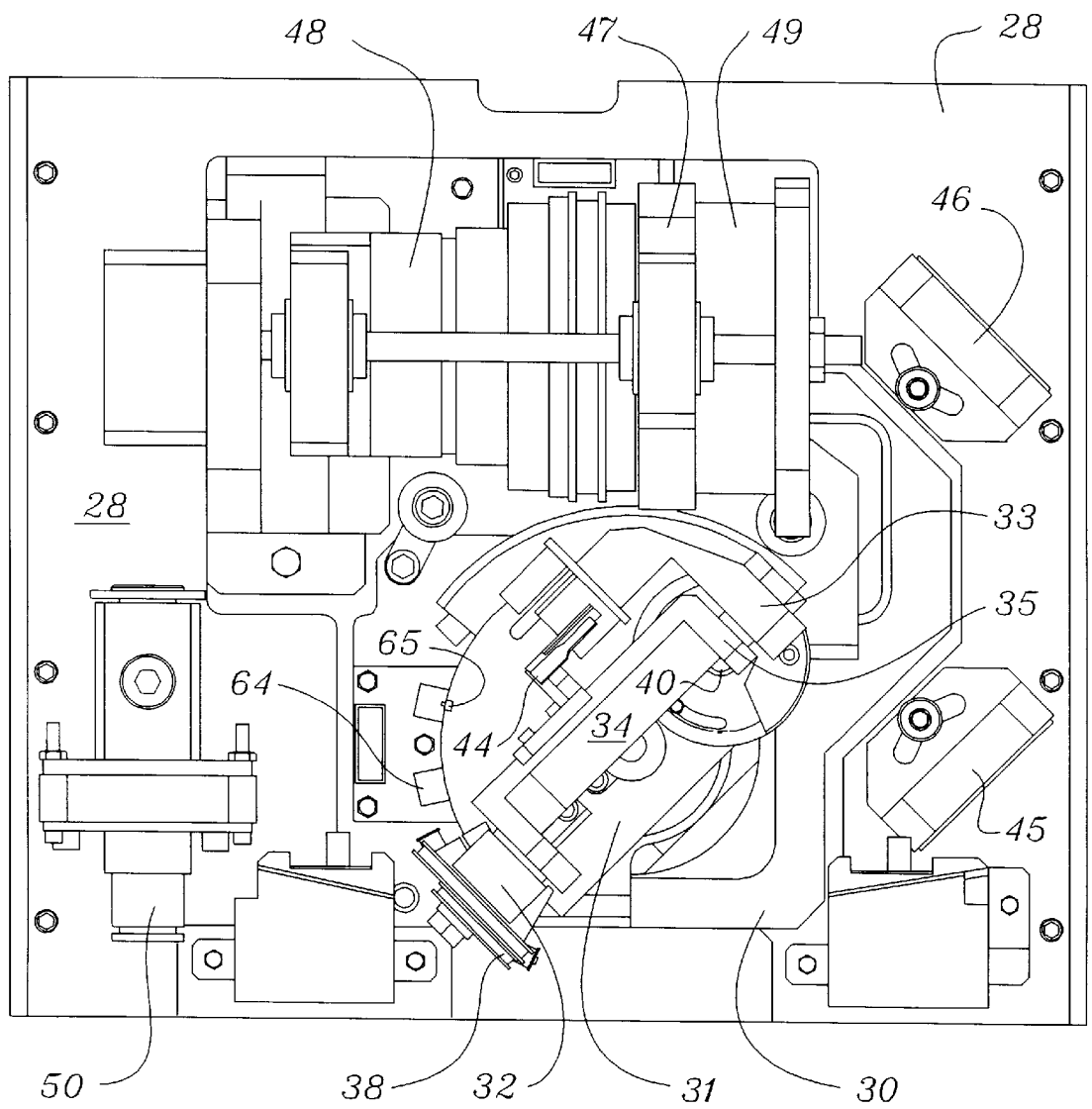
FIG. 4 is a top plan view of the present preferred embodiment shown in FIG. 3.
Figure 5:
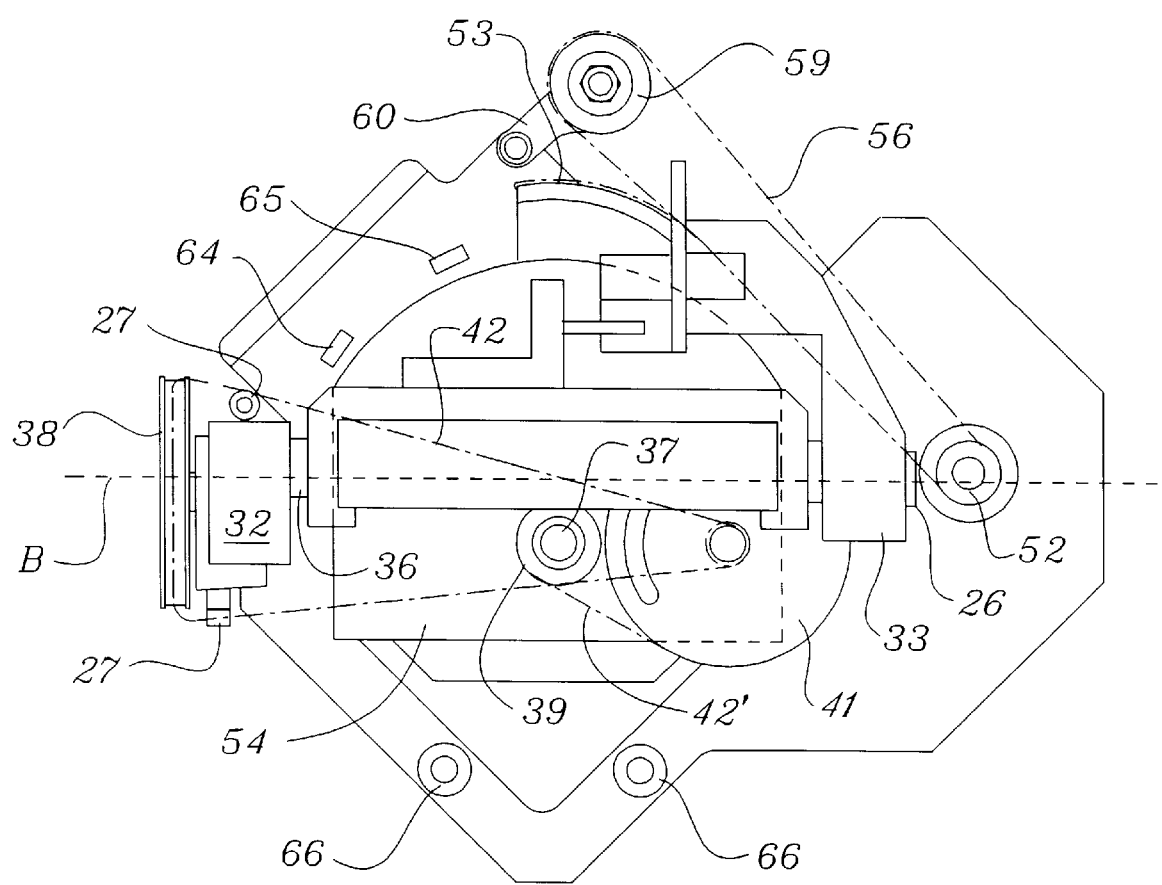
FIG. 5 is a diagram showing a top view of the primary components in the embodiment shown in FIGS. 3 and 4 with the drive cables shown in double dash and dotted line.
Figure 6:
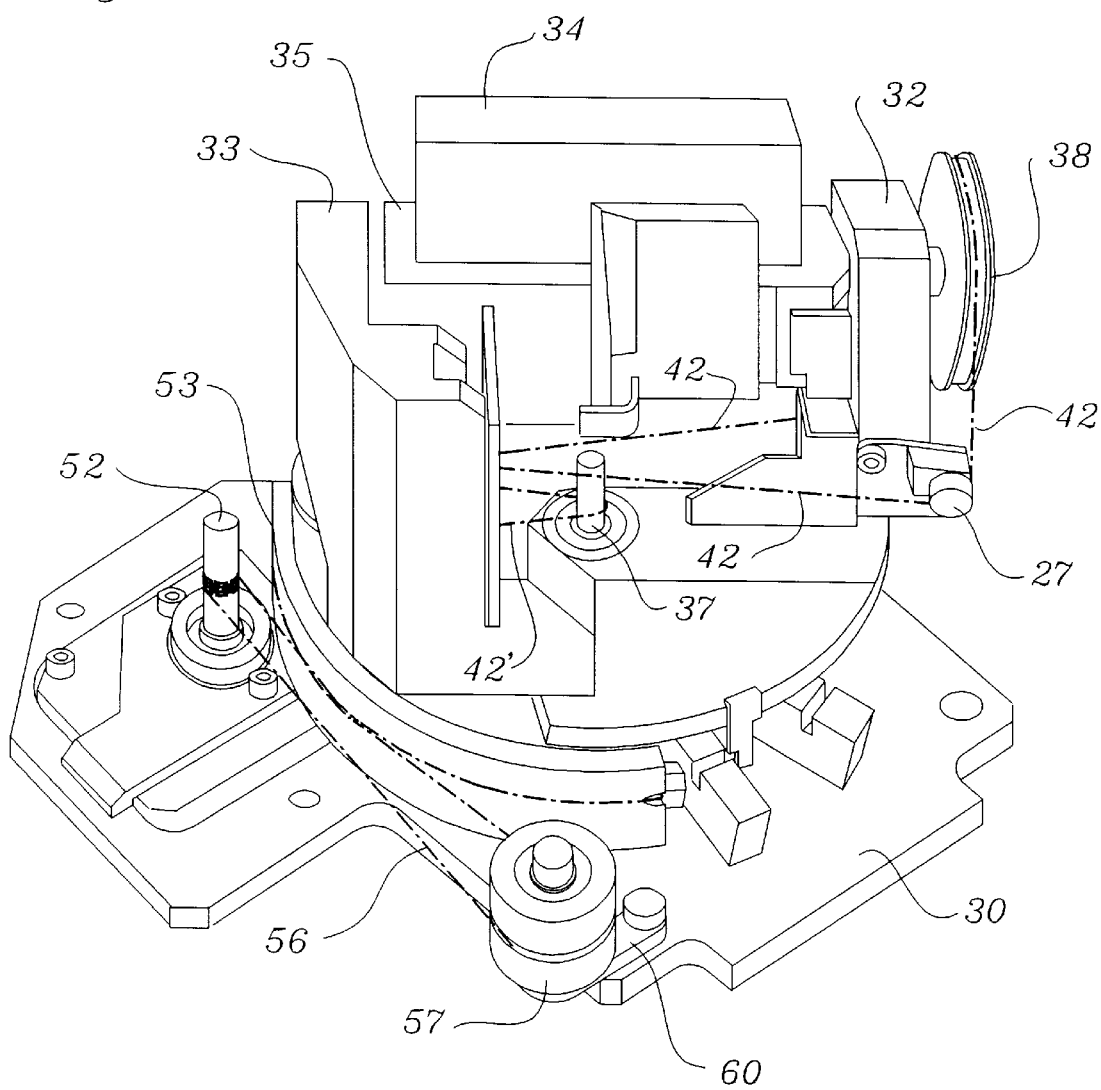
FIG. 6 is a rear elevational view of the embodiment shown in FIGS. 3, 4 and 5.

Referring to FIG. 4, when this device is used, the pan/tilt mirror 34 is positioned to receive a reflected light beam from the person or object to be identified. The light beam is reflected from pan/tilt mirror 34 to directing mirrors 45 and 46 through the lens assembly 47 to a narrow field of view (NFOV) camera 48 that extends below the level of the lens assembly 47. A motor 49 is provided to precisely control focus. We may optionally include a magnifying lens as well as a primary lens 36 within the lens assembly. We prefer to provide light sources 62 on opposite sides of the mirror and two wide field of view (WFOV) cameras 50 on one side of the housing 28. Other orientations for the light sources and cameras may be used. The light source may emit any selected band of light frequencies including visible light, infrared light or both visible light and infrared light. The light source preferably is a light emitting diode that emits infrared light. A lens and diffuser (not shown) are typically used to guarantee uniform illumination from the LED. We have found infrared light to be particularly useful because it penetrates eyeglasses and sunglasses more easily than visible light or colored light within the visible spectrum. Infrared light is also invisible to the user and extremely unobtrusive. Optical filters may be placed in the light path in front of the camera or the lens assembly to reduce any undesirable ambient light wavelengths that corrupt the desired images. If desired, the LED light source could be strobed. Strobing provides the capability to freeze motion.

Our device has three degrees of freedom, the pan axis, the tilt axis and the focus axis. The pan and tilt axes are used to position the pan/tilt mirror 34 so that the correct narrow field is imaged onto the sensing array of camera 48. The focus axis allows the lens to be moved so that the imaged object is in focus.

The design of the optics resolution, magnification focusing and size of the imager dictates the distance between the camera and lens and the distance between the lens and object to be imaged. The size of the imager is of paramount importance in defining the distance from lens to imager and contributes to the depth of focus. Those versed in the art will recognize that camera 48 may be solid state or of vidicon nature and that the sensing array size can vary from generic industry sizes of ¼, ⅓, ½, ⅔ or 1 inch diagonal measurement. In an optical system, the introduction of a mirror in an optical path allows the path to be redirected without effecting the optical path length. As can be seen in FIG. 4, there are three mirrors 34, 45 and 46 in the optical path from the object of interest to the camera 48. In the ATM of FIG. 1 only two mirrors are required 34 and 23. The use of these mirrors allows the optical path to be folded back on itself thus reducing the overall required physical length needed to implement the optical design. In addition, by using a beam splitting mirror infrared illumination from light source can be injected in the optical path so that light is projected on the object of interest. This produces on axis illumination which allows surface features to be imaged with no shadows which can generate false edges or other artifacts. On axis illumination of the eye produces a shadow free image with good surface features. This type of lighting causes the pupil to be white making the iris easier to locate. Any shadows produced by other light sources and camera angles are minimized or washed out. Other nearly on-axis illumination such as around the camera housing may be used.

Being able to rotate the pan/tilt mirror 34 around the pan axis A and tilt axis B allows the camera's field of view to be directed along the pan (left to right) and tilt (up and down) axes. The center of the optical axis through the focusing lens intersects with the center of the pan/tilt mirror. The use of a directing mirror has the advantage that while in our preferred embodiment the mirror's motion in either the pan or tilt axis is ±17.5 degrees, the camera actually perceives a doubling effect and can effectively view ±35 degrees in either the pan or tilt axis. This is a major advantage as compared to mounting a camera on a pan/tilt stage, since less physical motion is required and significantly less weight must be moved. Thus, the present design allows for the required field of view but does not require physical motion of the camera and attached optics while changing the field of view.

The focus axis is used to adjust the position of the lens with respect to the camera's array so that the field of view that is projected on the camera array is in proper focus. In the embodiment that is described, a multiple element lens is used for forming the image on the array. The distance between the back of the lens and camera's imaging element, such as a charge coupled device or CCD, is adjusted to provide focus. This mutiple lens acts as a single fixed focal length lens. It is also possible to have a mechanically coupled set of lenses (typically two) so that a telephoto lens is implemented. For this case, the single linear motion will control both the distance between lenses and the relative location of the lens closest to the array. This can further be extended to include a motor controlling the linear position of each lens with the coupled motion under software control. Furthermore, the lens arrangement could be a telecentric design, vanifocal, or another arrangement that maintains a constant magnification and focus on the NFOV camera's sensing array independent of the location of the image under consideration.

Our device can be operated manually by using a joystick. In such a scenario each axis is controlled by a joystick and an operator in the loop performs the adjustments. It is also possible to couple the pan/tilt axis together with a single x-y type joystick and associated controller so that the operator could merely move the stick in the desired direction and the field of view would follow appropriately. Those versed in robotics will recognize that coordinate transformations may be necessary to convert the natural coordinate system defined by the pan/tilt axis into the x-y coordinate system defined by the joystick. Furthermore, the control between the joystick and pan/tilt mechanism may be a simple proportional closed loop position control or evolve toward more sophistication such as a PID (proportional integral derivative) or a LQG (linear quadratic Gaussian) optimal control scheme. Alternative concepts such as resolved rate motion control in which the position of the x-y joystick defines the speed of motion of the pan/tilt axes are possible. Regardless, the focus axis would need to remain independent since the operator would perform the final judgment in determining if the objects in the field of view were properly focused.

We prefer to provide computer control using two wide field of view cameras. The cameras supply images to a computer processing unit which then processes them. Commands are sent from the CPU to the motors to change the location of the pan/tilt axes or to adjust focus. This system, shown in FIG. 3, contains the basic optical platform of the first embodiment plus one or two wide field of view (WFOV) fixed focus, fixed location cameras 50 with associated LED assemblies 62. Each LED assembly consists of an infrared LED assembly (such as OPTO DIODE's OD669) and a beam forming lens. The beam forming lens is coated to optimally pass IR light at a wavelength of 880 nanometers. The lenses are angled in such a way as to evenly illuminate a wide field with IR. This field is slightly longer than that imaged by the wide field of view cameras. Camera 48 is a narrow field of view (NOFV) camera having a field of view which overlaps a subset of the field of view seen by the fixed position/focus WFOV cameras 50.

In the context of iris identification, the optical system 30 and cameras are required to perform under computer control. The directives for positioning the pan/tilt mirror via control of the pan axis, tilt axis and focus axis location will be generated based on processing information from the WFOV cameras 50. The WFOV cameras could utilize a number of techniques such as stereo, stereo with structured light, and depth from focus via structured light to determine both the x-y location and distance to the object of interest. For iris identification that location is either the left or right eye. Given a scene in the wide field of view, a set of coordinates {x, y, z} with respect to the WFOV coordinate system can be determined. These coordinates can then be passed to a controller in order to generate the correct axis commands to position the pan and tilt and focus axes.

A calibration procedure must be used to correlate the center of the NFOV camera's field of view with pan/tilt and focus axis positions for a series of coordinates in 3 dimensional space as defined by the wide field of view. Given a set of WFOV coordinates {x,y,z} defining the position of a user's eye somewhere in the working volume in front of the cameras, a transformation or table look up can be used to define the coordinates of the pan, tilt and focus {p,t,f} axes that make the center of the NFOV camera's field of view coincident with x,y coordinates and in focus on the z plane.

In the simplest case, one may consider that a WFOV image is acquired, the data is processed and then passed to the controller. In order to minimize motion time and control settling time, all three axes can perform simultaneous motion, that is they start and stop simultaneously.

A second requirement stems from the condition that the object of interest, namely the eye, in the WFOV may be moving. There is a requirement that the NFOV camera track the trajectory seen by the WFOV. This is so that when motion ceases, a quality image may be acquired via the NFOV camera and optics. By tracking the eye, the optics directing light to the NFOV camera are aligned so that when it is desired to obtain an iris quality image little or no additional motion may be required.

In this case, the x,y,z coordinates from analysis of the WFOV images are sent to the NFOV controller at some uniform sample rate (such as every 100 ms). A continuous path algorithm such as described in *Robotic Engineering An Integrated Approach*, by Klafter, Chmielewski and Negin (Prentice Hall, 1989) would be used to provide intermediate sets of {p,t,f} set points to the axis so that the axes remain in motion during the tracking phase. To define the last end position, either a macro level command can be given or the same {p,t,f} can be continually sent at the sample periods.

It is important to recognize that as the NFOV axes move, the associated imager may not have sufficient time to perform the required integration to get a nonblurred image. Additionally, depending on the camera used (interlaced or progressive scan) there may be field to field displacement or horizontal displacement of the image. Thus, it is easily seen why the WFOV camera provides the information necessary for directing the NFOV stage. It should be noted, that certain eye tracking algorithms (such as those based on specularity or iris configuration or pattern matching) may be capable of providing sufficient information (even if the image is slightly blurred due to focus or exhibits some blur caused by motion) to provide a reasonable estimate of the eye location in the NFOV camera. Thus it is conceptually possible to use the WFOV data for coarse movement and the processed NFOV data (during motion) as additional information for finer resolution. This fusion of data can provide a better estimate than WFOV camera data alone in positioning the NFOV image to acquire a quality iris image.

To acquire a quality iris image, the NFOV axes must settle to a point where the residual motion is less than that which can be detected by the imager. Once this occurs, any remaining images must be purged from the imager (typically there is a delay between an image integrated and the readout via RS170) and the proper integration time allowed to acquire a non blurred image. See *Robotic Engineering An Integrated Approach* for a timing scenario. This can be accomplished in a number of ways, the simplest being a time delay which occurs after the cessation of motion until a good RS170 image is captured.

Since minimizing the settling time of the mechanical stages is of importance in obtaining a quality iris image with the minimal delay, the control strategy for motion control requires careful consideration. As mentioned in the description of the present preferred embodiment, the use of stepper motors and cable drives provide precise control and virtually eliminates lost motion.

Figure 7:
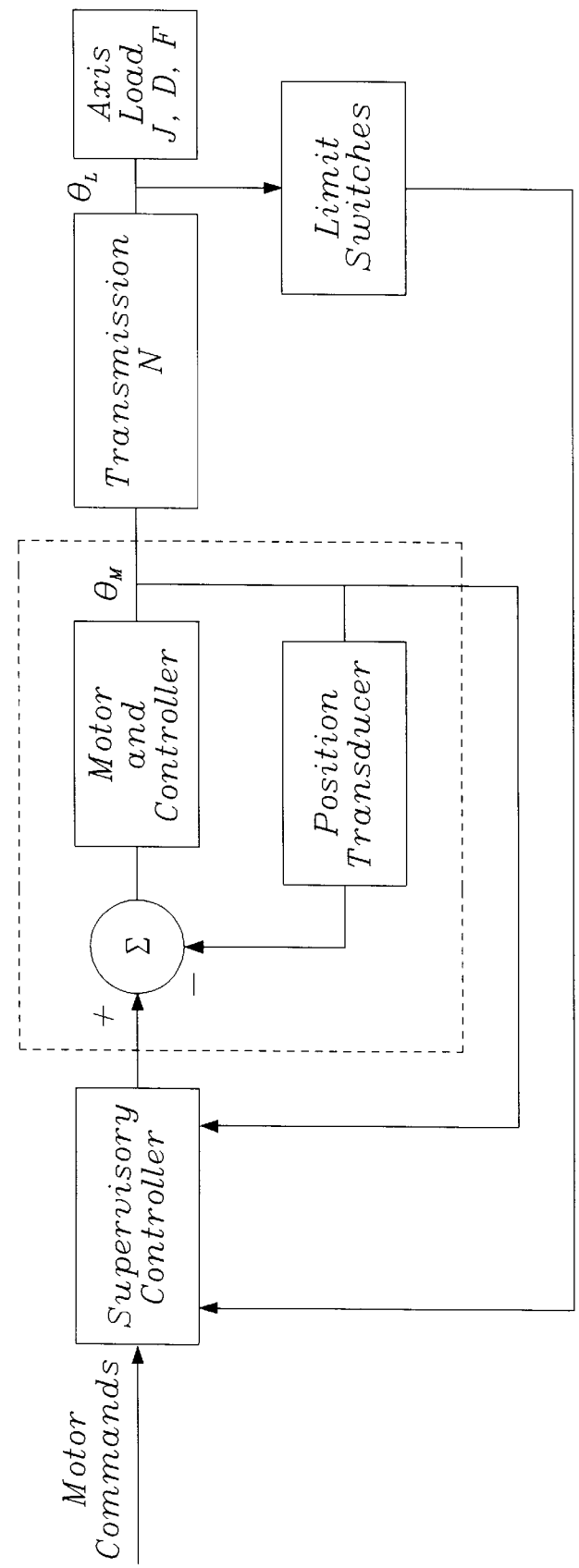
FIG. 7 is a block diagram showing a preferred axis control architecture.

FIG. 7 shows a preferred axis control architecture. Each of the three axes (pan, tilt, and focus) is based on this architecture. As depicted, the architecture will allow implementation of continuous path algorithms as well as a variety of control techniques including but not limited to robust and or optimal control.

The dotted box depicts a position control loop. In the case of a dc motor, this could be a proportional loop consisting of the motor, power amplifier, a position transducer, summing junction and the appropriate controller. Since the controller is microprocessor based, it is evident that this loop can be implemented in software such as a control algorithm and summing junction) with the appropriate hardware interfaces for receiving position feedback data and supplying the motor with the correct drive signal. This implementation does not preclude other approaches such as a complete digital axis control or the use of analog feedback with the appropriate digital or computer interfaces.

For the case of a stepper motor, which is inherently a position device, one may appropriately model the dotted box without the explicit use of position feedback. Alternatively, an additional feedback loop may be placed around the stepper to gain additional control capability, such as settling time.

The motor's output is coupled through a transmission (with gear ratio N) to the axis being controlled. The axis load is modeled with both linear (inertial and viscous damping terms) as well as friction loads, F, and potentially gravitational terms (if the load is unbalanced and a torque can be produced). The limit switches or alternatively optical sensors are used to provide reference points defining limits of motion or the center point of motion for the axis under consideration.

The supervisory controller accepts motor commands while monitoring the motor shaft position and limit switch data ultimately producing the control input, to the position control loop.

Figure 8:
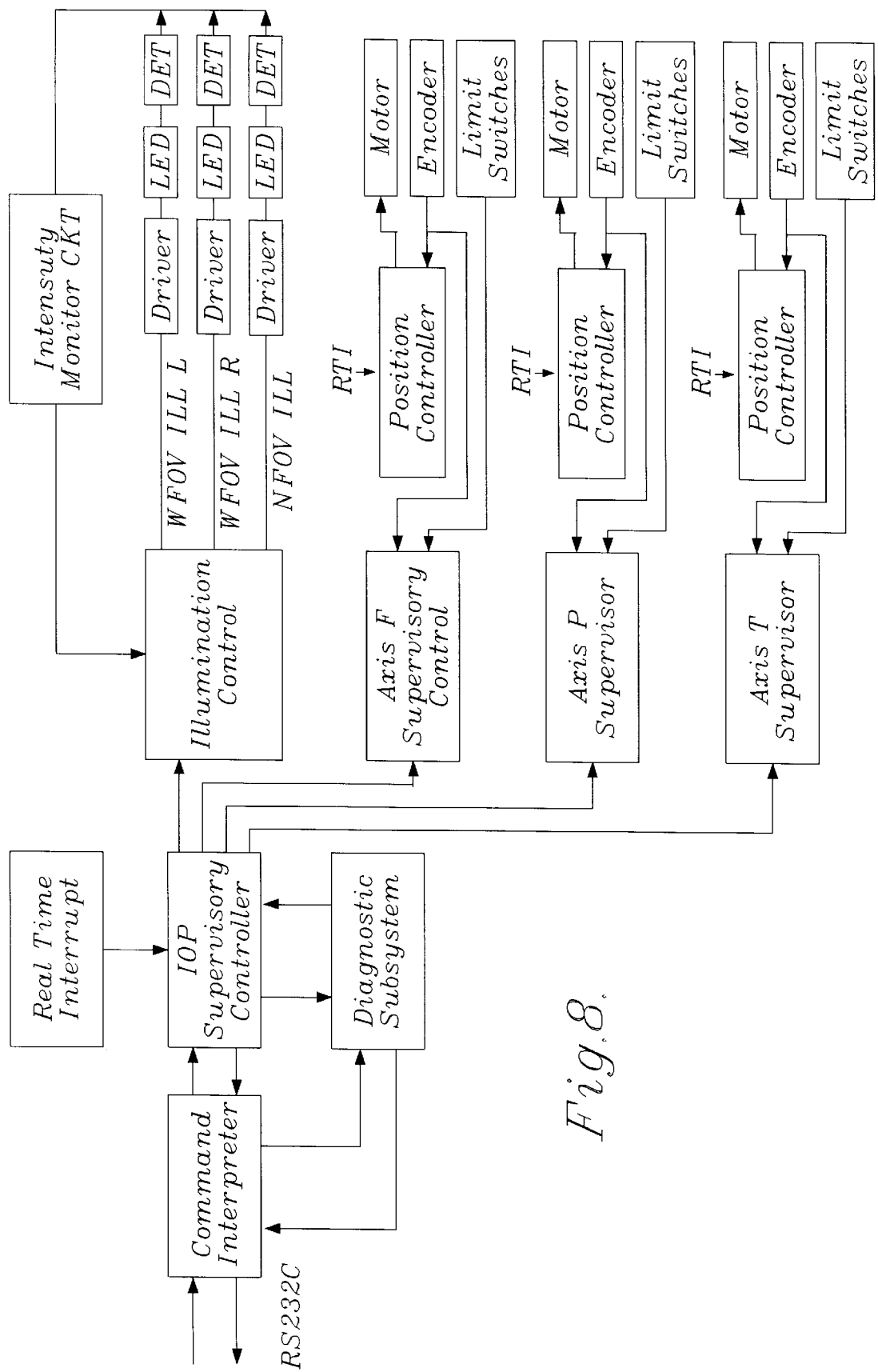
FIG. 8 is a block diagram showing a preferred optical control architecture.

FIG. 8 shows the control architecture for the our optical device. An IOP Supervisory Controller accepts macro level commands from the command interpreter and generates the proper set points and/or commands for use by the illumination control or each axis supervisor. It is envisioned that the intermediate continuous path set points for the axis are generated here and then sent to each axis supervisory controller. A command interpreter decodes the commands from the image analysis and formats responses using positioning information from the optical devices. A real time interrupt produces a known clock signal every n milliseconds. This signal is a requirement for the implementation of a sampled data system for the position controller of each axis and allows synchronization via the supervisory controller for continuous path motion. A diagnostic subsystem performs health check for the control system.

Besides the choreography of the three axis, the microprocessor controller must also provide illumination control. Similar to the commands associated with motion control, the controller will accept directives that control the illuminators.

Figure 9:
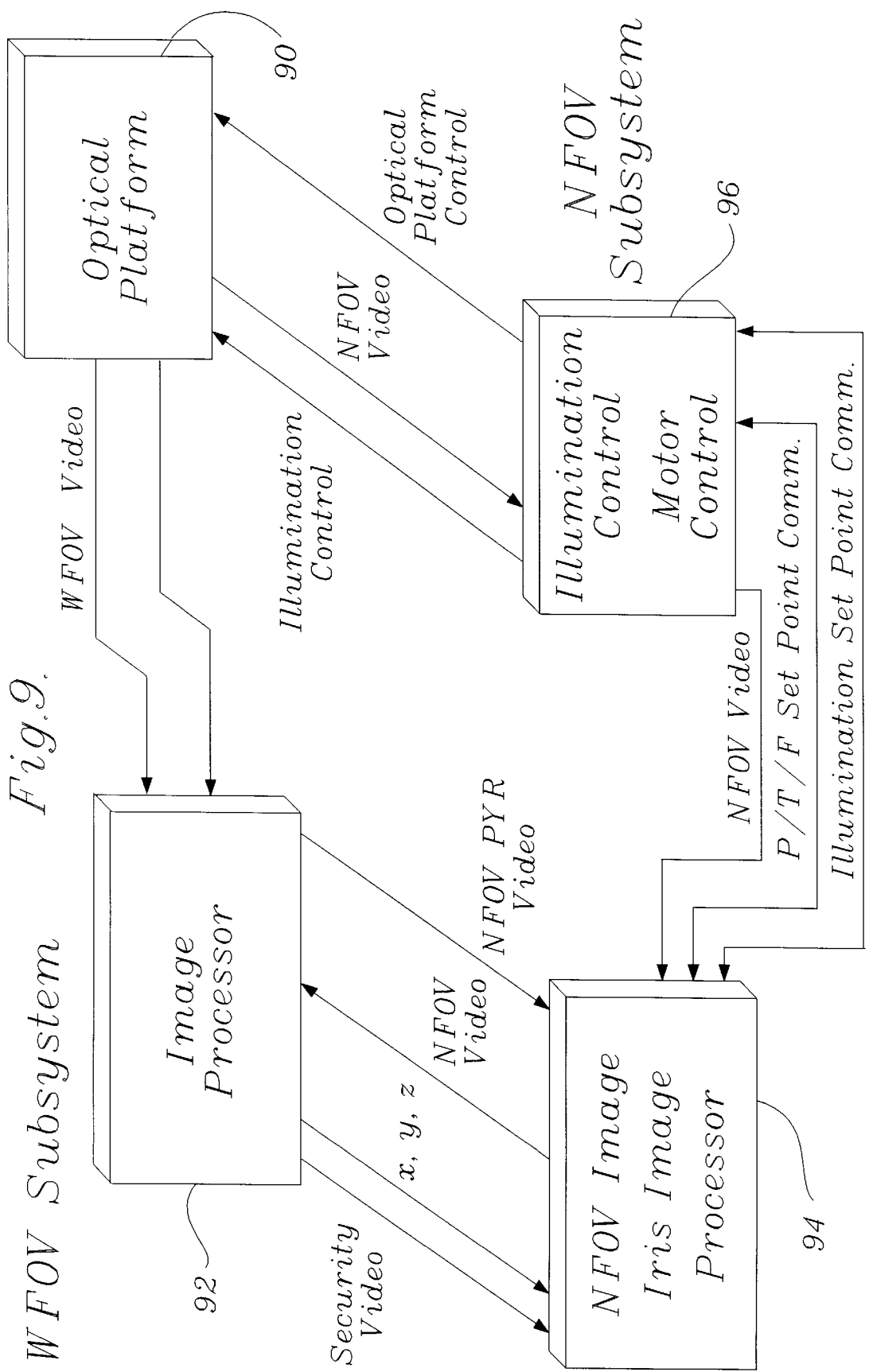
FIG. 9 is a block diagram showing a present preferred control architecture for our image steering and focusing device when used for iris identification.

The block diagram of FIG. 9 illustrates how our compact image steering and focusing device can be used under computer control for iris identification of the user of an automated teller machine. Box 90 represents the embodiment shown in FIGS. 3, 4, 5 and 6 and is generally identified as the optical platform. That embodiment contains NFOV camera 48 and two WFOV cameras 50. Images from the WFOV are transmitted as analog signals to WFOV subsystem image processor 92. The image processor preferably contains two pyramid processors, a memory capable of storing at least two frames, one LUT, ALV device, a digitizer which digitizes the analog video signal, a Texas Instrument TMS 320 C-31 or C-32 processor and a serial/parallel processor. The image is processed using the pyramid processors as described in U.S. Pat. No. 5,359,574 to van der Wal. The Texas Instruments processor computes disparities between images. The WFOV images defines a region or point in the field of view of the WFOV cameras where the subject's right eye or left eye are located. Using stereo processing techniques on the disparities will result in x,y,z coordinates for points on the subject relative to the WFOV cameras. That information is then further processed to define an area of interest such as an eye. The coordinates of the area of interest are used to direct the NFOV optical system. These position coordinates are transferred from the image processor to a NFOV image and iris image processor 94. This unit 94 contains a microprocessor and associated memory. In the memory are programs and algorithms for directing the optical platform and doing iris identification. Additionally, WFOV video images can be stored as a security video record as indicated by the Security Video arrow. Output from the NFOV image processor is sent to the NFOV subsystem 96 which contains controllers for the motors and the LED's in the optical platform. The NFOV subsystem then activates the motors in the optical platform to adjust the pan/tilt mirror and lens to focus the NFOV camera and illuminator on that region or point. Images from the NFOV camera are directed through the NFOV subsystem to the NFOV Image Processor 94. That video is digitized and used for iris identification. The image processor could also use the WFOV images for stereo processing to obtain subject position coordinates or for eye tracking.

The focus axes of the NFOV system may be controlled in an open loop fashion. In this case, the Z coordinate from stereo processing defines via table look up the focus Axis position so that the lens properly focuses the NFOV camera on the object of interest. A closed loop focus method could also be used. In this case, NFOV video would be processed by 94 and maybe 92 to obtain a figure of merit defining if the Axis was in focus. From the figure of merit the axis could be commended to forward or backward and then a new image acquired. The process would continue in a closed loop form until the image is in focus.

Although we have shown certain present preferred embodiments of our compact image steering and focusing device and methods of using that device, it should be distinctly understood that our invention is not limited thereto but may be variously embodied within the scope of the following claims.

We claim:

1. A compact image steering and focusing device comprising:
   a. a housing;
   b. a platform rotatably attached to the housing for rotation about a pan axis;
   c. a first stepper motor;
   d. a cable drive connected between the platform and the first stepper motor to enable the first stepper motor to rotate the platform about the pan axis;
   e. a pair of substantially parallel, spaced apart arms extending from the platform, there being a tilt axis passing between and equidistant from the arms;
   f. a primary mirror pivotably attached between the arms and able to be rotated around the tilt axis;
   g. a mirror drive motor attached to the platform;
   h. a mirror cable drive connected between the primary mirror and the mirror drive motor in a manner to be able to rotate the primary mirror about the tilt axis;
   i. a primary lens positioned on the housing and aligned with the primary mirror; and
   j. a lens motor attached to the housing and connected to the primary lens in a manner to be able to move the lens along an optical path toward and away from the primary mirror.

2. The device of claim 1 wherein the mirror cable drive is comprised of
   a. an axle connected to the primary mirror;
   b. a pulley on the axle; and
   c. a cable connected between the mirror drive motor and the pulley.

3. The device of claim 2 wherein the pulley is a split pulley.

4. The drive of claim 2 also comprising at least one angular contact bearing over which the cable runs.

5. The device of claim 1 wherein the mirror drive motor has an output shaft and is positioned so that the output shaft is coincident with the pan axis.

6. The device of claim 1 also comprising a camera aligned with the primary lens in a manner so that light passing through the primary lens will go into the camera.

7. The device of claim 1 also comprising at least one secondary mirror positioned between the primary mirror and the primary lens.

8. The device of claim 1 also comprising a light source positioned so that a light beam emitted from the light source will be reflected from a subject to the primary mirror.

9. The device of claim 8 wherein the light source can emit at least one of infrared light, visible light, a select band of frequencies, and both infrared and visible light.

10. The device of claim 8 wherein the light source is a strobe light.

11. The device of claim 10 also comprising:
   a. a camera positioned to receive a light beam emitted from the light source, reflected by the primary mirror and reflected back from a scene; and
   b. a synchronizer connected to the camera and the light source for synchronizing the operation of the camera with the strobing of the light source.

12. The device of claim 8 also comprising a strobing device connected to the light source.

13. The device of claim 8 wherein the light source is a light emitting diode.

14. The device of claim 1 also comprising at least one limit switch connected to one of the motors.

15. The device of claim 1 also comprising at least one position sensor mounted in a manner to determine positions of at least one of the primary mirror, the primary lens and the rotatable platform.

16. The device of claim 1 also comprising a second camera attached to the housing.

17. The device of claim 16 also comprising a third camera attached to the housing wherein the second camera and the third camera have overlapping fields of view.

18. The device of claim 17 also comprising an image processor which receives images of a subject in the overlapping fields of view from both the second camera and the third camera and processes those images to determine an x, y, z coordinate position relative to the second and third cameras for a point on the subject forward which point the first camera can be directed.

19. The device of claim 16 also comprising:
   a. a first camera aligned with the primary lens in a manner so that light reflected from the primary mirror and passing through the primary lens will go to the first camera;
   b. an image processor which receives images from the second camera and identifies at least one point in the images corresponding to a point on a subject being photographed by the second camera; and
   c. a controller connected to the image processor and the mirror drive motor which activates the mirror drive motor to position the primary mirror so that light reflected from the point on the subject to the primary mirror will be reflected by the primary mirror to the first camera.

20. The device of claim 19 wherein the image processor is programmed to compare images from the second camera to determine if the subject is moving, calculate a motion path of a moving subject and direct the mirror drive motor to compensate for such motion.

21. The device of claim 1 also comprising:
   a. a narrow field of view camera which receives light reflected from a subject to the primary mirror and is reflected from the primary mirror to the narrow field of view camera;
   b. a wide field of view camera; and
   c. an image processor which receives images from both cameras and identifies at least one point in images received from at least one camera which point corresponds to a point of interest on a subject being imaged.

22. The device of claim 21 wherein the image processor identifies the at least one point in images received from the one of the narrow field of view camera and the whole field of view camera.

23. The device of claim 1 also comprising a controller connected to the first stepper motor and a position sensor connected to the controller wherein the position sensor provides signals to the controller and the controller supplies the stepper motor with corresponding drive signals.

* * * * *